United States Patent
Furuya (10) Patent No.: US 11,433,871 B2
(45) Date of Patent: Sep. 6, 2022

(54) HYBRID VEHICLE AND METHOD OF CONTROLLING THE SAME

(71) Applicant: TOYOTA JIDOSHA KABUSHIKI KAISHA, Toyota (JP)

(72) Inventor: Yoshihiro Furuya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 237 days.

(21) Appl. No.: 16/942,867

(22) Filed: Jul. 30, 2020

(65) Prior Publication Data

US 2021/0129826 A1    May 6, 2021

(30) Foreign Application Priority Data

Nov. 5, 2019  (JP) .............................. JP2019-200586

(51) Int. Cl.
  *B60W 20/13*  (2016.01)
  *B60W 10/26*  (2006.01)

(52) U.S. Cl.
  CPC ............ *B60W 20/13* (2016.01); *B60W 10/26* (2013.01); *B60W 2710/1022* (2013.01); *B60W 2710/244* (2013.01)

(58) Field of Classification Search
  CPC ................ B60W 20/13; B60W 10/26; B60W 2710/1022; B60W 2710/244; B60W 10/08; B60W 10/06; B60W 2530/12; B60W 20/16; Y02T 10/62; Y02T 10/72
  See application file for complete search history.

(56) References Cited

U.S. PATENT DOCUMENTS

| 2016/0144849 A1* | 5/2016 | Minamikawa | B60W 10/06 180/65.265 |
| 2017/0066435 A1* | 3/2017 | Morisaki | B60K 6/445 |
| 2018/0149103 A1* | 5/2018 | Nishigaki | F02N 11/0829 |
| 2018/0245492 A1* | 8/2018 | Higa | B60K 6/445 |

FOREIGN PATENT DOCUMENTS

JP      2017177877 A    10/2017

* cited by examiner

*Primary Examiner* — Tyler J Lee
*Assistant Examiner* — Yufeng Zhang
(74) *Attorney, Agent, or Firm* — Dickinson Wright, PLLC (57) ABSTRACT

An ECU is configured to control an SOC control center of a battery and perform an engine torque suppression control. The engine torque suppression control is a control that suppresses output of an engine during a predetermined period of time after starting a system, and causes motor generators to output torque supplementing the suppressed output of the engine. When a deposition amount of PM on a filter exceeds a first specified amount, the ECU raises the SOC control center by controlling the motor generators before stopping the system as compared to when the deposition amount of PM is lower than a specified amount, and performs the engine torque suppression control at a next start after stopping the system.

13 Claims, 6 Drawing Sheets

| INSUFFICIENT TIME TO PERFORM SUPPRESSION CONTROL [sec] | 0 | 10 | 50 | 100 | 500 | 1000 |
|---|---|---|---|---|---|---|
| BASE RAISING AMOUNT $\Delta S_{base}$ | 0 | 1 | 5 | 10 | 15 | 15 |

FIG. 8

| GPF BLOCKAGE LEVEL | 0 | 1 | 2 | 3 | 4 | 5 |
|---|---|---|---|---|---|---|
| CORRECTION COEFFICIENT k1 | 1.0 | 1.0 | 1.0 | 1.1 | 1.2 | 1.5 |

FIG. 9

| OUTSIDE AIR TEMPERATURE Ta [°C] | -30 | -20 | -10 | -5 | 0 | 10 |
|---|---|---|---|---|---|---|
| CORRECTION COEFFICIENT k2 | 1.5 | 1.2 | 1.0 | 1.0 | 1.0 | 1.0 |

HYBRID VEHICLE AND METHOD OF CONTROLLING THE SAME

CROSS-REFERENCE TO RELATED APPLICATION

This application claims priority to Japanese Patent Application No. 2019-200586 filed on Nov. 5, 2019, incorporated herein by reference in its entirety.

BACKGROUND

1. Technical Field

The disclosure relates to a hybrid vehicle and a method of controlling the same, and more particularly, related to a technology for controlling a hybrid vehicle provided with a filter that collects particulate matter in engine exhaust gas.

2. Description of Related Art

For example, as disclosed in Japanese Unexamined Patent Application Publication No. 2017-177877 (JP 2017-177877 A), a configuration of a hybrid vehicle has been known that is provided with a filter that collects particulate matter (PM) in exhaust gas.

SUMMARY

When the temperature of an engine is low immediately after starting a system of the hybrid vehicle (that is, at cold-start of the engine), the amount of PM emission from the engine is large as compared to after the engine has been warmed up. Therefore, it is conceivable that, immediately after the start of the system, a motor generator is controlled such that output of the engine is suppressed and torque that supplements the suppressed engine output is output (for example, see JP 2017-177877 A). Hereinafter, the mentioned control is also referred to as "engine torque suppression control" (sometimes abbreviated simply as "suppression control").

In the engine torque suppression control, the electric power stored in a battery is consumed to drive the motor generator. For this reason, the length of a period of time in which the engine torque suppression control can be performed depends on a state of charge (SOC) of the battery. When the state of charge of the battery is low, there is a possibility that the engine torque suppression control cannot be continued for a long time. In addition, there is another possibility that the degree to which the engine output can be suppressed is reduced (an output reduction amount to be described later).

In order to secure a driving force of the hybrid vehicle despite the low state of charge of the battery, an increase of the engine output may be performed even before the engine is warmed up. However, the increase of the engine output may result in the increase in the amount of PM emission. In contrast, giving priority to suppression of the amount of PM emission, traveling of the hybrid vehicle has to be limited, which may lead to an actual driving force that is insufficient for a request driving force demanded by operation of a user. Then, there is a possibility that drivability of the hybrid vehicle is reduced.

The disclosure has been made in consideration of the above-mentioned circumstances, and an object of the disclosure is to provide a hybrid vehicle capable of both suppression of PM emission and suppression of reduction in drivability.

(1) An aspect of the disclosure relates to a hybrid vehicle. The hybrid vehicle includes an engine, a filter, a power storage device, an electric driving device, and a control device configured to control an SOC of the power storage device to be within an SOC control range and perform a suppression control. The filter is configured to collect particulate matter in exhaust gas of the engine. The electric driving device is configured to output torque using electric power stored in the power storage device and charge the power storage device. The suppression control is a control that suppresses output of the engine during a predetermined period of time after starting a vehicle system, and causes the electric driving device to output torque supplementing the suppressed output of the engine. The control device is configured to raise the SOC control range by controlling the electric driving device before stopping the vehicle system as compared to when the deposition amount is lower than the specified amount, when a deposition amount of particulate matter on the filter exceeds a specified amount, and perform the suppression control at a next start after stopping the vehicle system.

(12) The electric driving device may include a first rotating electric machine configured to charge the power storage device, and a second rotating electric machine configured to output torque using electric power stored in the power storage device. The control device may be configured to raise the SOC control range by controlling at least one of the first and second rotating electric machine.

With the configurations (1) and (12) above, the SOC control range of the power storage device is raised before stopping the vehicle system of the hybrid vehicle (specifically, parking). As a result, when the vehicle system is started next time, a larger amount of electric power can be secured in the power storage device than when the SOC control range is not raised, and the time during which suppression control can be performed becomes longer. Therefore, with the above configurations (1) and (12), it is possible to achieve both suppression of PM emission and suppression of decrease in drivability.

(2) The control device may be configured to raise the SOC control range when the deposition amount of the particulate matter exceeds the specified amount and there is a history of canceling the suppression control due to a decrease in SOC of the power storage device during the predetermined period of time. (3) The control device may be configured to increase a raising amount of the SOC control range as an insufficient time to perform the suppression control by canceling the suppression control becomes larger for the predetermined period of time, when there is the history.

When the suppression control is performed to raise the SOC control range even though there is no need for the suppression control (or the need for the suppression control is low), the input/output range of the power storage device is narrowed (shifted to the charging side). As a result, the frequency of operation of the engine increases, and thus the fuel efficiency of the hybrid vehicle as a whole may deteriorate. With the configuration (2) above, the suppression control can be avoided not to be excessively performed by limiting the raising of the SOC control range to the case where there is the history that the suppression control is canceled. Further, with the above configuration (3), the raising amount of the SOC control range can be set to an appropriate value by determining the raising amount of the SOC control range according to the actual insufficient time to perform the suppression control (actual result).

(4) The control device may increase a raising amount of the SOC control range as the deposition amount of the particulate matter increases.

The greater the amount of particulate matter that has already deposited on the filter, the greater the need to perform suppression control to avoid new deposition. With configuration (4) above, the higher the need to perform the suppression control, the larger the raising amount of the SOC control range. In this way, the suppression control can be continued for a longer time at next start of the vehicle system.

(5) The control device may be configured to raise the SOC control range when the deposition amount of particulate matter exceeds the specified amount and an outside air temperature is lower than a specified temperature. (6) The control device may be configured to increase the raising amount of the SOC control range as the outside air temperature decreases.

As the outside air temperature is lower, cold-start of the engine is more likely to occur, and particulate matter is more likely to be generated. In contrast, when the outside air temperature is high, the demerit of deterioration of fuel efficiency may be greater than the merit of suppressing emission of particulate matter. With the above configuration (5), the suppression control can be avoided not to be excessively performed by limiting the raising of the SOC control range to the case where the outside air temperature is lower than the specified temperature. Further, with the configuration (6) above, the raising amount of the SOC control range can be set to an appropriate value by determining the raising amount of the SOC control range according to the low outside air temperature.

(7) The control device may be configured to limit a raising amount of the SOC control range to be smaller than an upper limit amount.

With the configuration (7) above, unnecessary deterioration of fuel efficiency of the hybrid vehicle can be suppressed by suppressing an excessive increase in a raising amount ΔS of the SOC control center.

(8) The control device may be configured to raise the SOC control range when a destination of the hybrid vehicle is a location where cold-start of the engine is expected at the next start of the vehicle system. (9) The control device may be configured to raise the SOC control range when an estimated arrival time at a destination of the hybrid vehicle is a time when cold-start of the engine is expected at the next start of the vehicle system.

Depending on the destination or estimated arrival time of the hybrid vehicle, the hybrid vehicle may restart after solely being parked for a short period of time and the engine may not be cold-started. With the configurations (8) and (9) above, unnecessary deterioration of the fuel efficiency of the hybrid vehicle can be suppressed by performing the suppression control in a situation in which the cold-start of the engine is likely to be performed.

(10) The control device may be configured to start raising the SOC control range when a scheduled traveling distance of the hybrid vehicle from a current position to a destination is shorter than a predetermined distance. (11) The control device may be configured to start raising the SOC control range when a scheduled traveling time of the hybrid vehicle from a current position to a destination is less than a predetermined time.

When the scheduled traveling distance of the hybrid vehicle exceeds the predetermined distance or when the scheduled traveling time exceeds the predetermined time, that is, when the hybrid vehicle is not to get close to the destination in terms of distance or time, raising the SOC control range may reduce the usable SOC range, which may result in deterioration of fuel efficiency of the hybrid vehicle. With the configurations (10) and (11) above, unnecessary deterioration of fuel efficiency of the hybrid vehicle can be suppressed by starting the SOC control range after the hybrid vehicle gets sufficiently close to the destination in terms of distance or time.

(13) Another aspect of the disclosure relates to a method of controlling a hybrid vehicle. The hybrid vehicle includes an engine, a filter, a power storage device, and an electric driving device. The filter is configured to collect particulate matter in exhaust gas of the engine. The electric driving device is configured to output torque using electric power stored in the power storage device and charge the power storage device. The method includes first and second steps. The first step is a step of raising an SOC control range of the power storage device when a deposition amount of particulate matter on the filter exceeds a specified amount by controlling the electric driving device before stopping the vehicle system, as compared to when the deposition amount is lower than the specified amount. The second step is a step of performing a suppression control at a next start after stopping the vehicle system. The suppression control is a control that suppresses output of the engine during a predetermined period of time after starting a vehicle system, and causes the rotating electric machine to output torque supplementing the suppressed output of the engine.

With the method (13) above, it is possible to achieve both suppression of PM emission and suppression of decrease in drivability as in the configuration (1).

With the hybrid vehicle according to the aspects of the disclosure, it is possible to achieve both suppression of PM emission and suppression of decrease in drivability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments will be described in detail with reference to the drawings. In the drawings, the same or corresponding elements are denoted by the same reference numerals and descriptions thereof will not be repeated.

Embodiments

Configuration of Hybrid Vehicle

Figure 1:
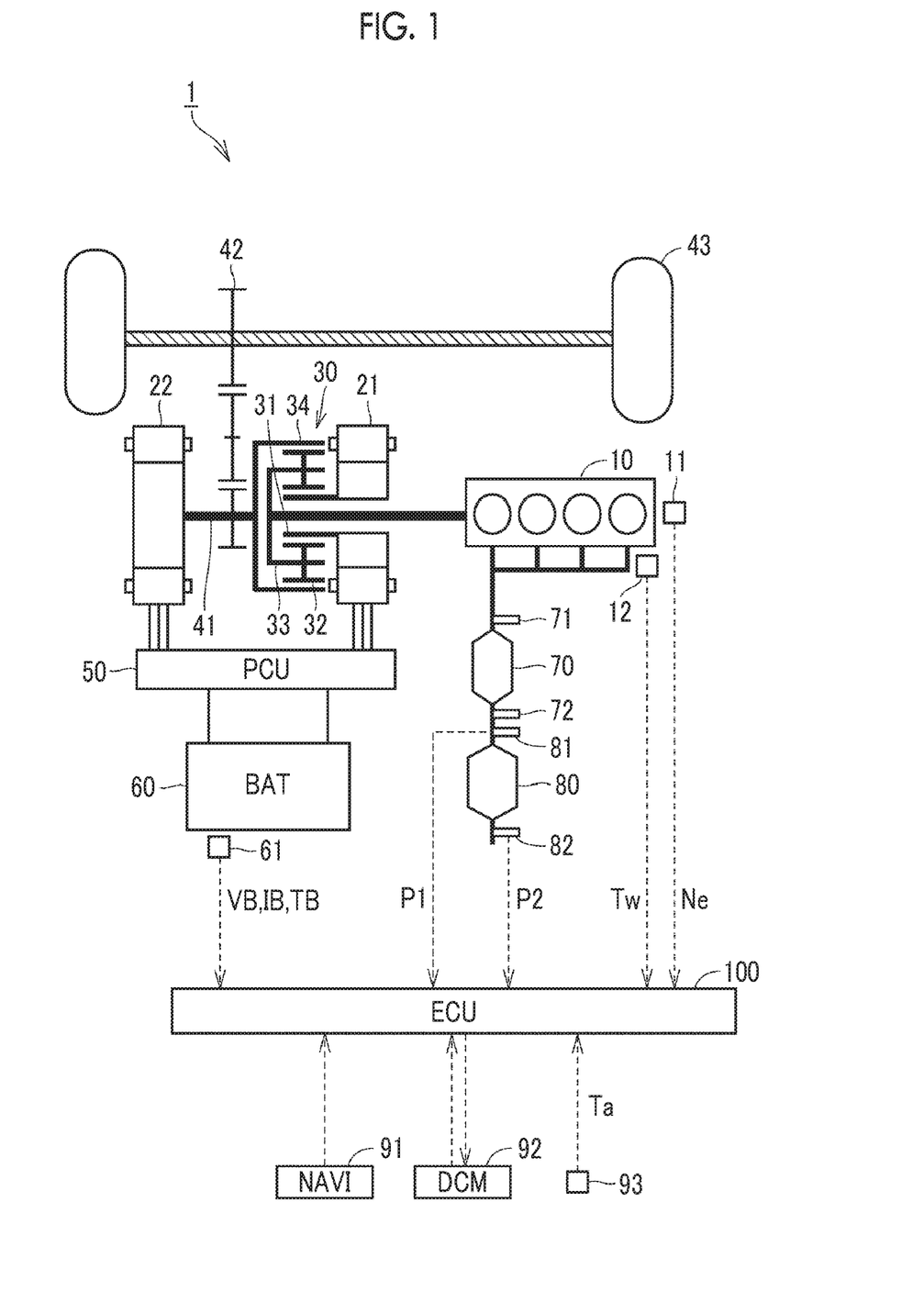
FIG. 1 is a block diagram schematically showing an overall configuration of a vehicle according to an embodiment of the disclosure.

FIG. 1 is a block diagram schematically showing an overall configuration of a vehicle according to an embodiment of the disclosure. Referring to FIG. 1, the vehicle 1 is a hybrid vehicle. The vehicle 1 includes an engine 10, motor generators 21, 22, a power split mechanism 30, a drive shaft 41, a reduction gear 42, drive wheels 43, an electric power control unit (PCU) 50, a battery 60, a catalyst device 70, a filter 80, a navigation system 91, a communication module 92, an outside air temperature sensor 93, and electronic control unit (ECU) 100.

The engine 10 outputs a driving force for the vehicle 1 to travel according to a control command from the ECU 100. In the embodiment, a gasoline engine is employed as the engine 10. It is noted that the fuel of the engine 10 is not limited to gasoline, and may be, for example, diesel fuel, biofuel (such as ethanol) or gas fuel (such as propane gas).

A crank position sensor 11 is provided at a position facing a crankshaft (not shown) of the engine 10. The crank position sensor 11 detects a rotation speed of the engine 10 (engine speed) Ne and outputs a detection result to the ECU 100.

A coolant temperature sensor 12 is provided in a circulation path (not shown) of coolant of the engine 10. The coolant temperature sensor 12 detects the temperature (engine temperature) Tw of the coolant of the engine 10, and outputs a detection result to the ECU 100.

Each of the motor generators 21, 22 is, for example, a three-phase alternate-current (AC) rotating electric machine in which a permanent magnet is embedded in a rotor (not shown). The motor generators 21, 22 are both driven by the PCU 50.

The motor generator 21 is connected to the crankshaft of the engine 10 through the power split mechanism 30. The motor generator 21 uses the electric power of the battery 60 to rotate the crankshaft of the engine 10. Further, the motor generator 21 can also generate electric power using the power of the engine 10. The AC electric power generated by the motor generator 21 is converted into DC electric power by the PCU 50 and the battery 60 is charged. In addition, the AC electric power generated by the motor generator 21 may be supplied to the motor generator 22.

The motor generator 22 rotates the drive shaft 41 by using at least one of the electric power from the battery 60 and the electric power generated by the motor generator 21. Further, the motor generator 22 can also generate electric power by regenerative braking. The AC electric power generated by the motor generator 22 is converted into DC electric power by the PCU 50 and the battery 60 is charged.

The power split mechanism 30 mechanically connects three elements, that is, the crankshaft of the engine 10, the rotation shaft (not shown) of the motor generator 21, and the drive shaft 41. The power split mechanism 30 is, for example, a planetary gear mechanism including a sun gear 31, a pinion gear 32, a carrier 33, and a ring gear 34.

The drive shaft 41 is connected to drive wheels 43 the reduction gear 42. The reduction gear 42 transmits the power from the power split mechanism 30 or the motor generator 22 to the drive wheels 43. Further, the reaction force received by the drive wheels 43 from a road surface is transmitted to the motor generator 22 through the reduction gear 42 and the power split mechanism 30. As a result, the motor generator 22 generates electric power during regenerative braking.

The PCU 50 converts DC power stored in the battery 60 into AC power and supplies the AC power to the motor generators 21, 22. The PCU 50 also converts the AC power generated by the motor generators 21, 22 into DC power and supplies the DC power to the battery 60. PCU 50 includes, for example, an inverter, a converter provided corresponding to the motor generator 21, and a converter provided corresponding to the motor generator 22 (neither shown).

The motor generators 21, 22, the power split mechanism 30, and the PCU 50 correspond to the "electric driving device" in the disclosure. In addition, the motor generators 21, 22 correspond to a "first rotating electric machine" and a "second rotating electric machine" in the disclosure, respectively.

The battery 60 discharges electric power for driving the motor generators 21, 22. The battery 60 is charged with the electric power generated by the motor generators 21, 22. As the battery 60, a secondary battery such as a lithium ion battery or a nickel hydrogen battery can be employed. The battery 60 corresponds to a "power storage device" in the disclosure. A capacitor such as an electric double layer capacitor may be used as the "power storage device".

The battery 60 is provided with a monitoring unit 61. The monitoring unit 61 includes a voltage sensor, a current sensor, and a temperature sensor (neither shown). The voltage sensor detects a voltage VB of the battery 60. The current sensor detects a current IB input and output to and from the battery 60. The temperature sensor detects a temperature TB of the battery 60. Each sensor outputs a signal indicating a detection result to ECU 100. The ECU 100 can estimate the SOC of the battery 60 based on the voltage VB, the current IB, and the battery temperature TB of the battery 60.

The catalyst device 70 is provided in an exhaust passage of the engine 10. The catalyst device 70 oxidizes unburned components (for example, hydrocarbons (HC) or carbon monoxide (CO)) contained in the exhaust gas emitted from the engine 10, or reduces oxidizing components (for example, nitrogen oxides (NOx)).

An air-fuel ratio sensor 71 is provided at a position upstream of the catalyst device 70 in the exhaust passage. The air-fuel ratio sensor 71 detects the air-fuel ratio of an air-fuel mixture of fuel and air in the exhaust gas. An oxygen sensor 72 is provided at a position downstream of the catalyst device 70 in the exhaust passage. The oxygen sensor 72 detects the oxygen concentration in the exhaust gas. Each sensor outputs, to the ECU 100, a detection result of each sensor. The ECU 100 calculates the air-fuel ratio based on the detection result from each sensor.

The filter 80 is provided at a position downstream of the oxygen sensor 72 in the exhaust passage of the engine 10. The filter 80 collects PM emitted from the engine 10. Since the engine 10 is a gasoline engine in the embodiment, a gasoline particulate filter (GPF) is employed as the filter 80. When the engine 10 is a diesel engine, the filter 80 is a diesel particulate filter (DPF).

A pressure sensor 81 is provided at a position upstream of the filter 80 and downstream of the oxygen sensor 72, in the exhaust passage of the engine 10. The pressure sensor 81 detects the pressure at a position upstream of the filter 80 (hereinafter, also referred to as "upstream pressure") P1. A pressure sensor 82 is provided at a position downstream of the filter 80 in the exhaust passage. The pressure sensor 82 detects the pressure P2 at a position downstream of the filter 80 (hereinafter, also referred to as "downstream pressure"). Each sensor outputs, to the ECU 100, a detection result of each sensor.

The navigation system 91 includes a global positioning system (GPS) receiver (not shown) that specifies the position of the vehicle 1 based on radio waves from an artificial satellite. The navigation system 91 executes various navigation processes of the vehicle 1 using the position information (GPS information) of the vehicle 1 specified by the GPS receiver. More specifically, the navigation system 91 outputs, to the ECU 100, information such as a recommended route from the current position of the vehicle 1 to the destination (for example, estimated arrival time, remaining traveling distance, remaining traveling time), based on the GPS information of the vehicle 1 and road map data stored in a memory.

The communication module 92 is a vehicle-mounted data communication module (DCM). The communication module 92 is configured to enable bidirectional data communication between a server (not shown) installed outside the vehicle 1 and the ECU 100.

The outside air temperature sensor 93 detects a temperature (outside air temperature) Ta of the outside air of the vehicle 1 and outputs a detection result of the sensor to the ECU 100.

ECU 100 includes a processor such as a central processing unit (CPU), a memory such as a read only memory (ROM) and a random access memory (RAM), an input/output port, and a counter (neither shown). The CPU executes a control program. The memory stores various control programs and maps. The input/output port controls transmission and reception of various signals. The counter measures time. The ECU 100 may be constituted by a plurality of ECUs which is divided for each function (for example, an engine ECU that controls the engine 10 and a battery ECU that controls charging and discharging of the battery 60).

The ECU 100 controls the devices such that the vehicle 1 is in a desired state based on the signals from the respective sensors and the maps and programs stored in the memory. More specifically, first, the ECU 100 determines the request driving force of the vehicle 1 according to an accelerator operation amount, the vehicle speed, and the like, and calculates a request power of the engine 10 from the request driving force. The ECU 100 determines, from the request power of the engine 10, for example, an engine operating point at which the fuel consumption amount of the engine 10 is minimized (a combination of an engine speed Ne and an engine torque Te) such that the system efficiency with respect to the request power of the engine 10 is optimized. Then, the ECU 100 generates a torque command for driving the motor generators 21, 22 such that the engine 10 operates at the engine operating point, and controls each part of the engine 10 (injector, spark plug, throttle valve, and the like) together with the control by the PCU 50.

Cooperation Between Engine Control and Battery Control

The PM flowing through the exhaust passage of the engine 10 is collected and deposited by the filter 80. When the deposition amount of PM on the filter 80 (hereinafter, also referred to as "GPF deposition amount") becomes excessively large, the filter 80 may be clogged and the filter 80 may be melted or cracked. Therefore, it is needed to remove PM when the GPF deposition amount reaches a certain amount while the deposition of PM is avoided. For this purpose, in the embodiment, the engine 10 and the battery 60 are cooperatively controlled.

Figure 2:
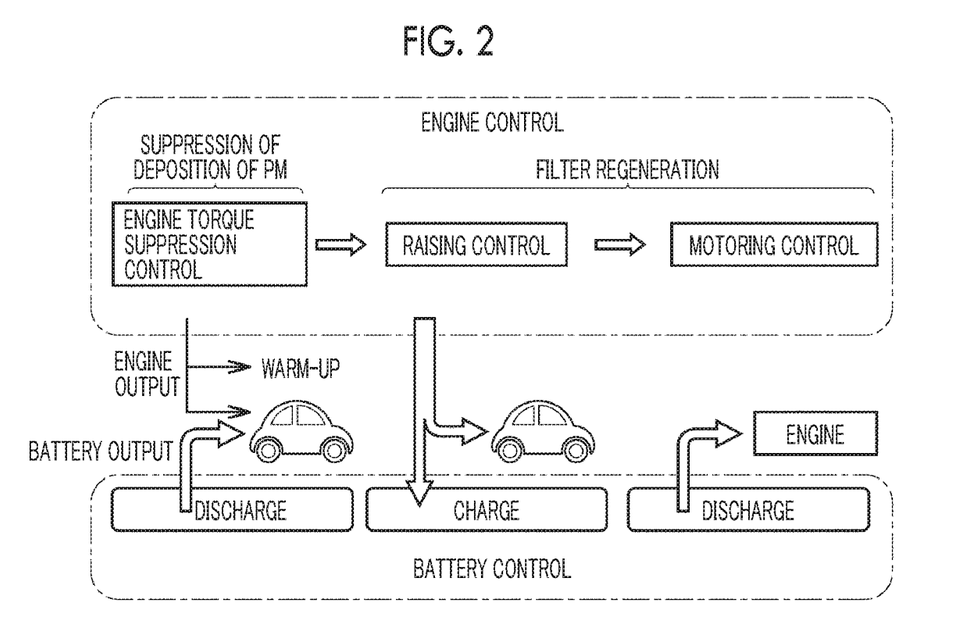
FIG. 2 is a conceptual diagram describing a cooperative relationship between an engine control and a battery control.

FIG. 2 is a conceptual diagram describing a cooperative relationship between the engine control and the battery control. Referring to FIG. 2, PM emission from engine 10 becomes significant during cold-start when engine 10 temperature is low. Therefore, when the GPF deposition amount exceeds a first reference amount D1, the "engine torque suppression control" is performed immediately after the system start of the vehicle 1 (immediately after the ignition is ON) to reduce the amount of PM emission (for example, see JP 2017-177877 A). The reference to "immediately after the system start" means a period of time from when the engine 10 is started by the user operating a power switch (not shown) provided in the vehicle 1 until the engine 10 is sufficiently warmed up, for example, several tens of seconds to several tens of minutes.

Figure 3:
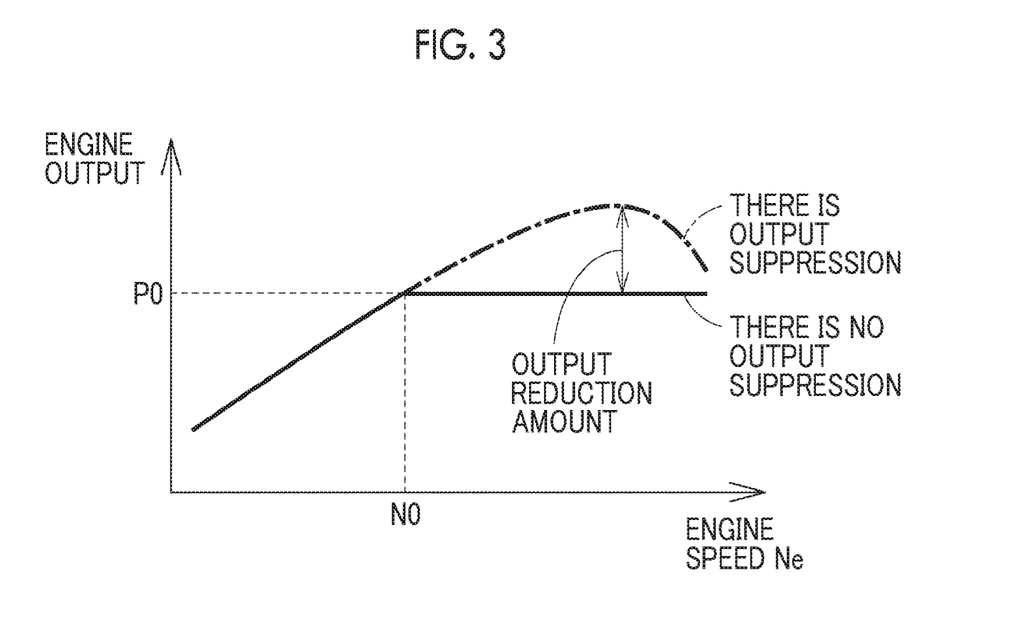
FIG. 3 is a diagram showing an example of an engine torque suppression control.

FIG. 3 is a diagram showing an example of the engine torque suppression control. In FIG. 3, the horizontal axis represents an engine speed Ne and the vertical axis represents an engine output. In the example shown in FIG. 3, when the engine speed Ne is equal to or higher than the rotation speed N0, the ECU 100 suppresses the engine output such that the engine output does not exceed an output P0. Specifically, the suppression of the engine output is achieved by reducing the fuel injection amount from the injector.

The output reduction amount due to the output suppression of the engine 10 is calculated by the difference between the engine output according to the engine speed Ne when the engine output is not suppressed and the output P0 (a fixed value in the example). The ECU 100 generates a torque command to the motor generator 22 such that the output reduction amount of the engine 10 (the reduction amount of the torque acting on the drive shaft 41 through the power split mechanism 30) is supplemented by the output of the motor generator 22. As a result, torque (so-called assist torque) that supplements the output reduction amount of the engine 10 is output from the motor generator 22. Since the fuel injection amount can be reduced by suppressing the output of the engine 10, the PM generation amount from the engine 10 can be reduced. Further, since the reduction in the driving force of the vehicle 1 due to the output suppression of the engine 10 is supplemented with the assist torque and thus the request driving force can be output corresponding to the user operation, it is possible to avoid the reduction in the drivability of the vehicle 1. When the engine torque suppression control is performed, the electric power for causing the motor generator 22 to output the assist torque is discharged from the battery 60.

Referring back to FIG. 2, even when the engine torque suppression control is performed, the GPF deposition amount may increase with the elapse of a certain time. When the GPF deposition amount exceeds a second reference amount D2 (where D2>D1), the ECU 100 performs a control for regenerating the filter 80. Specifically, the ECU 100 raises the temperature of the filter 80 to a regenerating temperature or higher (for example, 500° C. to 600° C.). In this way, the PM deposited on the filter 80 is oxidized and removed by the combustion reaction with nitrogen dioxide (NO$_2$) or the like. As the control for regenerating the filter 80, for example, the raising control and the motoring control can be combined.

The raising control is a control for increasing the output of the engine 10 when the filter 80 needs to be regenerated. The output of the engine 10 when the filter 80 needs to be regenerated is set to be larger by a predetermined amount with reference to the output (normal value) when the filter 80 does not need to be regenerated. Specifically, the raising control is carried out by adjusting at least one of a throttle valve opening degree, the fuel injection amount, and an ignition timing. When the output of the engine 10 is increased, the temperature of exhaust gas emitted from the engine 10 becomes higher. As a result, the temperature of the filter 80 can be raised to the regenerable temperature, and thus the removal of PM deposited on the filter 80 can be promoted. When the raising control is executed, the battery 60 is charged with the electric power generated by the motor generator 21 due to the increase in the output of the engine 10.

The motoring control is a control for rotating the crankshaft (not shown) of the engine 10 in the combustion stopped state by using the torque of the motor generator 21. Air is drawn into the engine 10 as the crankshaft rotates. The oxygen in the sucked air is supplied to the filter 80 without being burned in the engine 10. Therefore, the combustion state of PM in the filter 80 is improved, and thus the removal of PM deposited on the filter 80 can be promoted. When the motoring control is performed, the electric power for causing the motor generator 21 to rotate the crankshaft of the engine 10 is discharged from the battery 60.

Engine Torque Suppression Control

In the engine torque suppression control, the electric power stored in the battery 60 is consumed to drive the motor generator 22. Therefore, the output reduction amount of the engine 10 in the engine torque suppression control or the length of the period of time in which the engine torque suppression control can be performed depends on the SOC of the battery 60. Further, when the SOC of the battery 60 decreases, the control upper limit value (upper limit discharge power) Wout of the electric power that can be discharged from the battery 60 is limited to a smaller value than when the SOC of the battery 60 is sufficiently high. Therefore, when the SOC of the battery is low, the electric power needed for the motor generator 22 cannot be supplied, and the engine torque suppression control may not be effectively performed.

Specifically, in order to secure a driving force of the vehicle 1 despite the low SOC of the battery 60, the increase of the engine output may be performed even before the engine 10 is warmed up. However, the increase of the engine output may result in the increase in the amount of PM emission from the engine 10.

In contrast, when the suppression of the amount of PM emission is given priority, the output reduction amount of the engine 10 cannot be supplemented by the assist torque from the motor generator 22 at an early stage, and traveling of the vehicle 1 has to be limited. Then, the actual driving force may be insufficient with respect to the request driving force corresponding to the user operation (accelerator operation amount). As a result, the drivability of the vehicle 1 may be reduced.

Therefore, in the embodiment, when the GPF deposition amount exceeds a first specified amount D1 ("specified amount" according to the disclosure), the battery 60 is charged before the system of the vehicle 1 stops (ignition off), and then the SOC is adjusted such that the SOC control range of the battery 60 is raised. More specifically, in the vehicle 1, the SOC of the battery 60 is controlled to be within a constant SOC range that includes a predetermined center value. Hereinafter, this center value is referred to as "SOC control center". In the embodiment, the SOC control center is raised in comparison to the case where the GPF deposition amount is the first specified amount D1 or less.

By raising the SOC control center as described above, the electric power stored in the battery 60 at the time of the next system start is larger than that in the case where the SOC control center is maintained (normal time). In other words, the electric power for supplementing the output reduction amount of the engine 10 with the assist torque is prepared for the next system start. In this way, the period of time during which the engine torque suppression control can be performed can be extended. As a result, it is possible to achieve both suppression of PM emission from the engine 10 and suppression of decrease in drivability of the vehicle 1.

Control Flow

Figure 4:
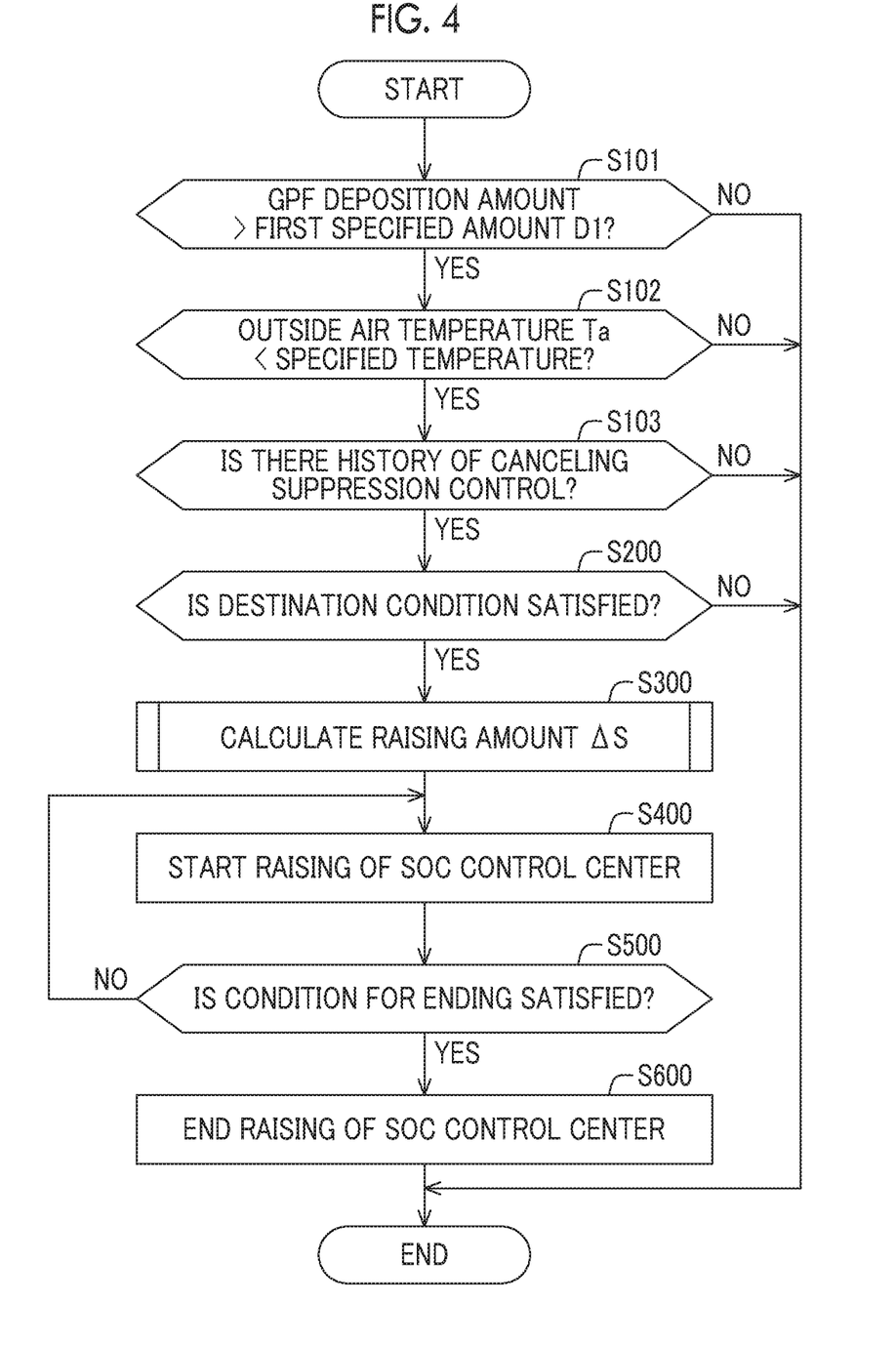
FIG. 4 is a flowchart showing a processing procedure of a cooperative control between an engine and a battery in the embodiment.

FIG. 4 is a flowchart showing a processing procedure of a cooperative control between the engine 10 and the battery 60 in the embodiment. Referring to FIG. 4, this flowchart is called from a main routine (not shown) and executed when the system of vehicle 1 is started. The steps of the flowcharts shown in FIG. 4 and FIGS. 5 and 6 to be described later are basically carried out by software processing by the ECU 100, but may be carried out by hardware processing by an electronic circuit produced in the ECU 100. In the following, the step is abbreviated as "S".

In S101, the ECU 100 determines whether or not the deposition amount of PM (GPF deposition amount) on the filter 80 exceeds a first specified amount D1. The differential pressure (P1−P2) between the upstream pressure P1 and the downstream pressure P2 of the filter 80 increases as the GPF deposition amount increases, and thus the current GPF deposition amount can be calculated based on the differential pressure (P1−P2). Further, the GPF deposition amount may be estimated using various sensors such as the air-fuel ratio sensor 71, the oxygen sensor 72, an airflow meter (not shown), a throttle valve opening degree sensor (not shown), and the coolant temperature sensor 12. When the GPF deposition amount exceeds the first specified amount D1 (YES in S101), the process proceeds to S102 by the ECU100.

In S102, determination is made as to whether or not the outside air temperature Ta acquired at the time of the latest system start in the state where the engine 10 is cooled is lower than a specified temperature (for example, a temperature below freezing point) (S102). When the outside air temperature Ta is low, the time needed to warm up the cold-started engine 10 becomes long. Therefore, in order to reduce the amount of PM emission, the engine torque suppression control is needed to be performed for a long time, and thus the electric power to be stored in the battery 60 is needed to be increased by that amount. Since the outside air temperature Ta may vary, it is desirable to use the average value of the outside air temperatures Ta acquired several times in the past, instead of using the outside air temperature Ta acquired only once most recently. When the outside air temperature Ta (preferably the average outside air temperature) is lower than the specified temperature (YES in S102), the process proceeds to S103 by the ECU 100.

In S103, the ECU 100 determines whether or not there is a history of canceling the engine torque suppression control on the way due to decrease in the SOC of the battery 60 (insufficient state of charge) in the latest specified number (for example, several times) of trips (the period of time from system start to system stop) (S103). This determination can be carried out by recording the number of times the engine torque suppression control was canceled on the way (it may be regarding whether or not there was canceling) using a flag or the like. When there is a history that the engine torque suppression control was canceled on the way (YES in S103), the process proceeds to S200 by ECU 100.

The ECU 100 determines that there is no need to raise the SOC control center for engine torque suppression control when the determination is NO even in one of S101 to S103, and ends the process. Further, not all of S101 to S103 are needed, and one or both of S102 and S103 may be omitted.

The reason for raising the SOC control center of the battery 60 (processing of S400 to be described later) is to prepare for the cold-start of the engine 10 at the next system start. Depending on the destination of the vehicle 1, such preparation may not be needed. Therefore, in S200, the ECU 100 determines whether or not a predetermined condition (destination condition) regarding the destination of vehicle 1 is satisfied.

Figure 5:
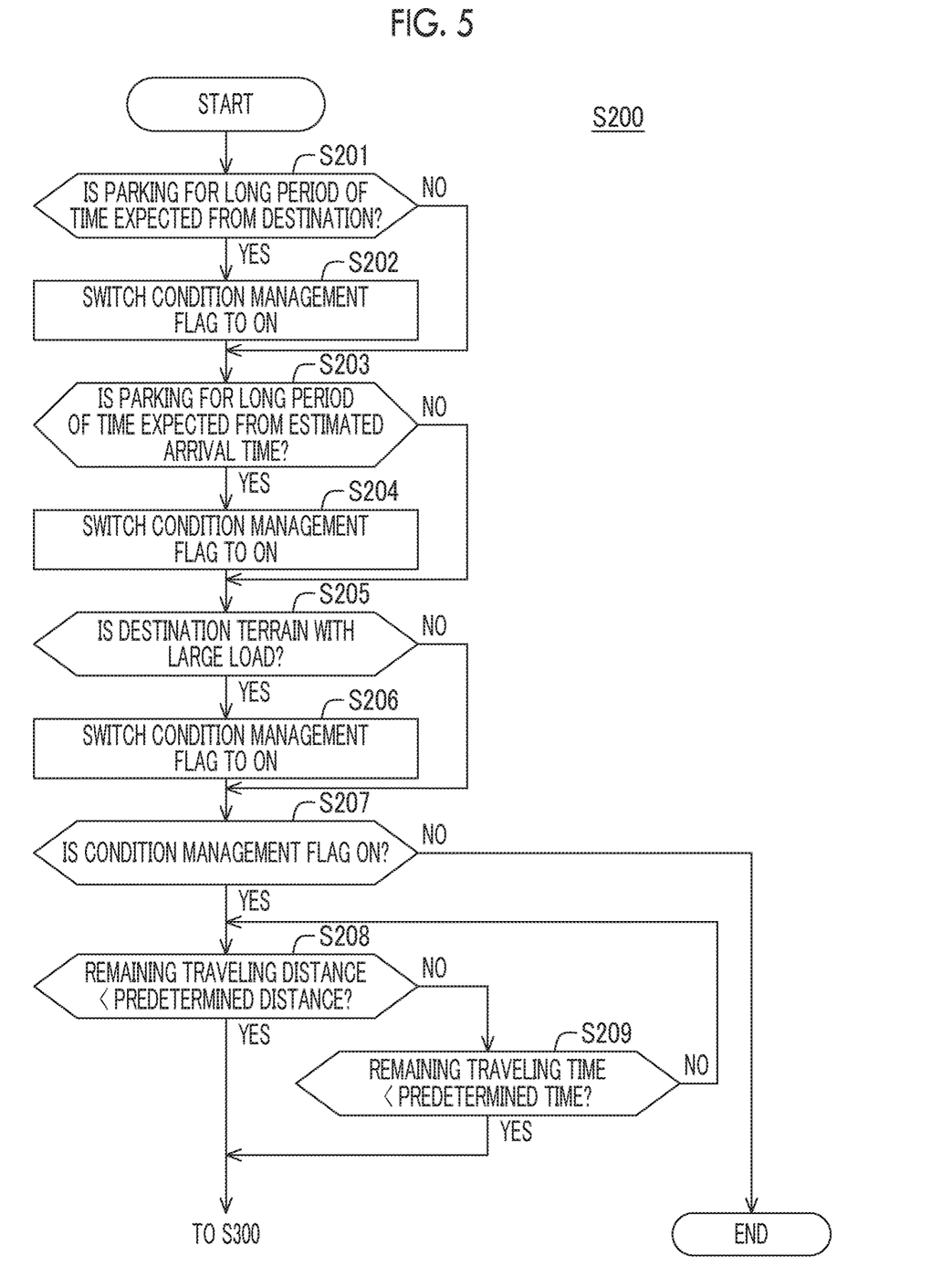
FIG. 5 is a flowchart showing a processing procedure for determining whether or not a destination condition is satisfied.

FIG. 5 is a flowchart showing a processing procedure for determining whether or not the destination condition is satisfied. The ECU 100 has a flag for managing whether or not the destination condition is satisfied. Hereinafter, the flag will be referred to as a "condition management flag". The condition management flag is off at the start of the process shown in the flowchart.

Referring to FIG. 5, in S201, the ECU 100 determines whether or not the next destination of the vehicle 1 input to the navigation system 91 is a location where parking for a long period of time (for example, 6 hours or more) is expected. For example, when the destination of the vehicle 1 is a point registered as the house of a user of the vehicle 1, the ECU 100 can determine that parking for a long period of time is expected. Alternatively, although not shown, the ECU 100 may acquire the past parking history of the vehicle 1 by communicating with a server (which may be a cloud) installed in a data center outside the vehicle 1 through the communication module 92. When the parking time exceeding the above time (6 hours in this example) is recorded in the past parking history for the destination of the vehicle 1, the ECU 100 can determine that parking for a long period of time is expected. Even if the past parking history of the vehicle 1 does not exist, even when the result of a big data analysis by the server indicates that the vehicle 1 will be parked at the destination for a long period of time, the ECU 100 receiving the analysis result from the server may determine that the vehicle 1 is expected to be parked for a long period of time. When the vehicle 1 is parked at the destination for a long period of time, it is likely that the engine 10 is cold-started at the next system start, whereas when the parking is completed within a short period of time, it is highly likely that the engine 10 restarts before cooling of the vehicle 1 proceeds.

However, as a result of the analysis by the server, when the temperature of the vehicle 1 is expected to cool down at the destination, it is likely that the engine 10 cold-starts at the next system start even when the parking time is relatively short. Therefore, instead of setting the "long period of time" of the parking time to a fixed value (for example, 6 hours), the server may provide the vehicle 1 with an appropriate value according to the expected change in the outside air temperature.

When the destination of vehicle 1 is expected to be a location to be parked for a long period of time (YES in S201), the ECU 100 switches the condition management flag to ON (S202), and then the process proceeds to S203 by the ECU 100. On the other hand, when the destination of vehicle 1 is not a location where parking for a long period of time is expected (NO in S201), the process proceeds to S203 by ECU 100 with the condition management flag being kept OFF.

In S203, determination is made as to whether the estimated arrival time of the vehicle 1 at the next destination acquired from the navigation system 91 is a time at which parking for a long period of time is expected. As an example, when the estimated arrival time is late at night (for example, the time after 21:00), the ECU 100 can determine that the user is unlikely to drive the vehicle 1 to go out again during the day, and parking for a long period of time is expected.

When the estimated arrival time of vehicle 1 at the destination is the time at which parking for a long period of time is expected (YES in S203), the ECU 100 switches the condition management flag to ON (S204), and the process proceeds to S205. On the other hand, when the estimated arrival time of vehicle 1 at the destination is not the time at which parking for a long period of time is expected (NO in S203), the ECU 100 skips S204 and the process proceeds to S205 by the ECU 100.

In step S205, the ECU 100 determines whether the terrain of the next destination of the vehicle 1 is a terrain with a large load applied to the motor generator 22 at the next system start of the vehicle 1. As a specific example, when the destination of the vehicle 1 is a point surrounded by an upslope (for example, a point located at the bottom of a mortar-like terrain), the vehicle 1 is highly likely to travel uphill while engine torque suppression control at the next system start is performed. In such an uphill traveling, since it is needed to increase the assist torque as compared with the case where the vehicle 1 travels on a flat road, the situation in which the stored electric power of the battery 60 is exhausted can be reached at an early stage. Therefore, when the terrain of the destination of the vehicle 1 is a terrain with a high load on the motor generator 22, it can be said that it is desirable to raise the SOC control center of the battery 60 in advance.

When the terrain of the destination of the vehicle 1 is a high load terrain (YES in S205), the ECU 100 switches the condition management flag to ON (S206), and then the process proceeds to S207. On the other hand, when the terrain of the destination of the vehicle 1 is not a high-load terrain (NO in S205), the ECU 100 skips S206 and the process proceeds to S207.

In S207, the ECU 100 determines whether or not the condition management flag is ON. When the condition management flag is ON, that is, when at least one of S202, S204, S206 is executed (YES in S207), the process proceeds to S208 by ECU 100. On the other hand, when the condition management flag is OFF, that is, when none of S202, S204, S206 is executed (NO in S207), ECU 100 ends the process. That is, the SOC control center is not raised.

When the SOC control center is raised even though the vehicle 1 is not close to the destination in terms of distance or time, it is likely that the fuel efficiency of the vehicle 1 is deteriorated due to the reduction of the available SOC control range. In order to minimize the deterioration of fuel efficiency, the SOC control center may be raised after the vehicle 1 is close enough to the destination in terms of distance or time.

In S208, the ECU 100 determines whether or not the remaining traveling distance (scheduled traveling distance) from the current position of the vehicle 1 to the destination is less than a predetermined distance (for example, several km to several tens of km). When the remaining traveling distance is equal to or greater than the predetermined distance (NO in S208), the ECU 100 further determines whether or not the remaining traveling time (scheduled traveling time) from the current position of vehicle 1 to the destination is less than a predetermined time (for example, ten minutes to several tens of minutes) (S209).

When the remaining traveling distance of vehicle 1 is equal to or greater than the predetermined distance and the remaining traveling time of vehicle 1 is equal to or greater than the predetermined time (NO in S208 and NO in S209), ECU 100 returns the process to S208. When the remaining traveling distance is less than the predetermined distance (YES in S208) or the remaining traveling time is less than the predetermined time (YES in S209), the process proceeds to S300 (see FIG. 4) by the ECU 100 to calculate raising amount ΔS of the SOC control center.

Figure 6:
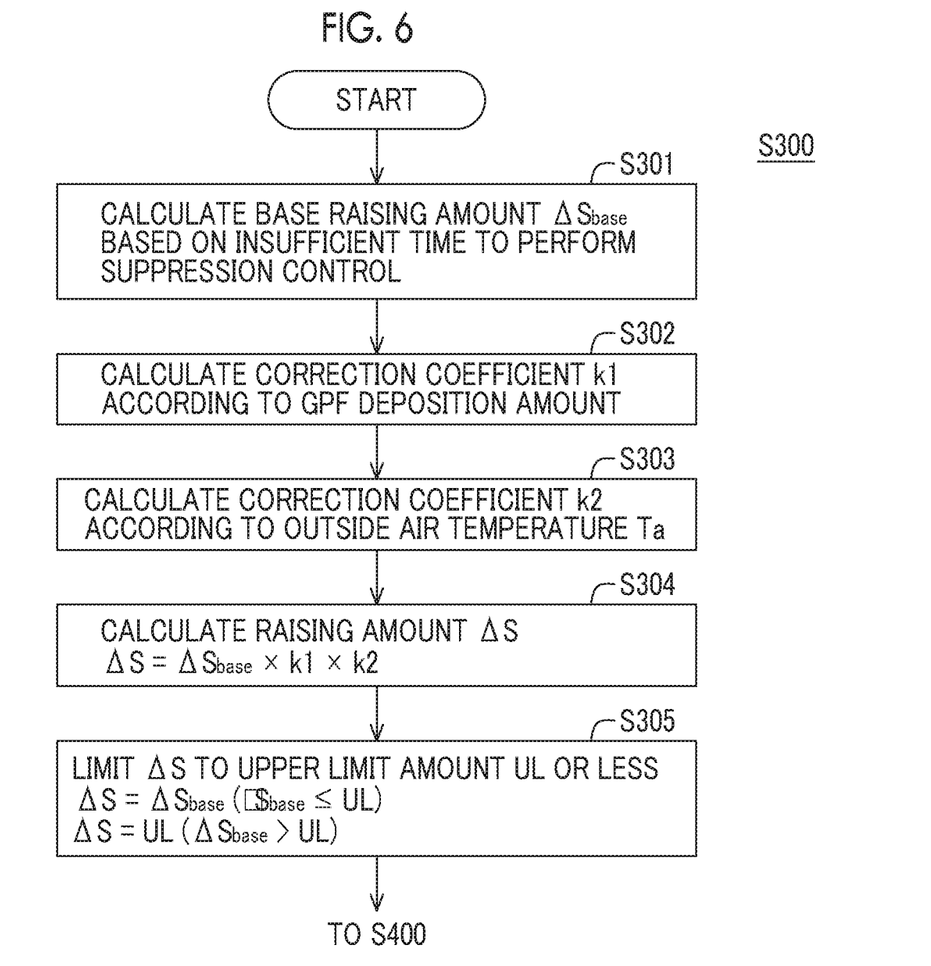
FIG. 6 is a flowchart showing a processing procedure for calculating a raising amount at an SOC control center.

FIG. 6 is a flowchart showing a processing procedure for calculating the raising amount ΔS of the SOC control center. Referring to FIG. 6, in S301, when there is a history that the stored electric power of battery 60 has been exhausted in the previous trip (or several past trips) and the engine torque suppression control has been canceled on the way, the ECU 100 calculates a base value (base raising amount) $\Delta S_{base}$ [unit: SOC point] of the raising amount ΔS of the SOC control center, based on an insufficient time to perform the engine torque suppression control (the time difference between the time when the engine torque suppression control would have been performed when the electric power stored in the battery 60 was sufficient and the time when the engine torque suppression control was performed before the control has been canceled on the way).

In S302 and S303, the ECU 100 calculates correction coefficients k1 and k2 for correcting the base raising amount $\Delta S_{base}$. Then, the ECU 100 calculates the raising amount ΔS of the SOC control center by multiplying the base raising amount $\Delta S_{base}$ by the correction coefficients k1 and k2 as shown in the following equation (1) (S304).

$$\Delta S = \Delta S_{base} \times k1 \times k2 \quad (1)$$

For example, a map can be used to calculate the base raising amount $\Delta S_{base}$ (processing of S301) and the subsequent calculation of correction coefficients k1 and k2 (processing of S302 and S303). A table or a relational expression may be used instead of the map.

Figure 7:
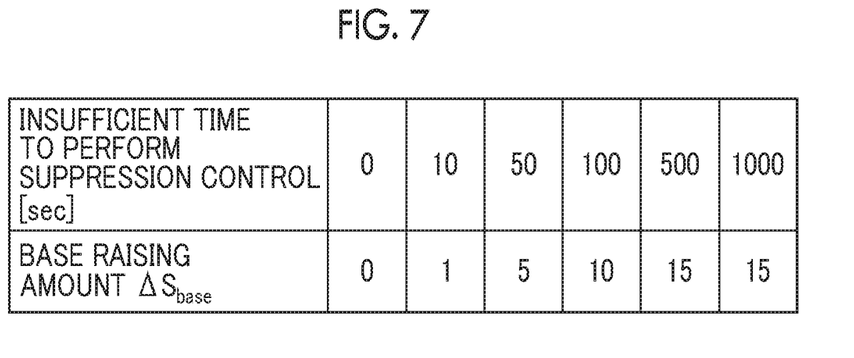
FIG. 7 is a conceptual diagram (first figure) describing an example of a map used for calculating the raising amount of the SOC control center.
Figure 8:
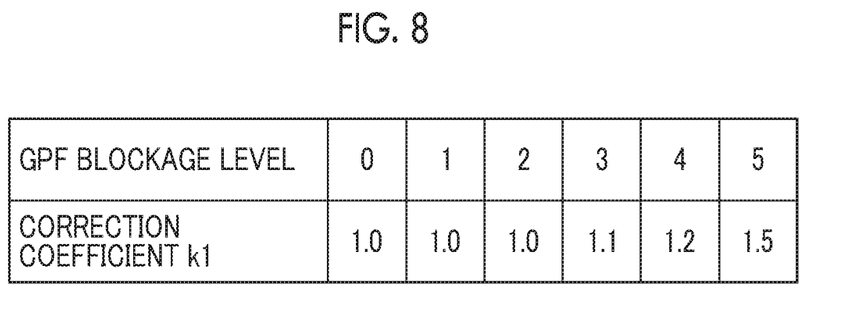
FIG. 8 is a conceptual diagram (second figure) describing an example of another map used for calculating the raising amount of the SOC control center.
Figure 9:
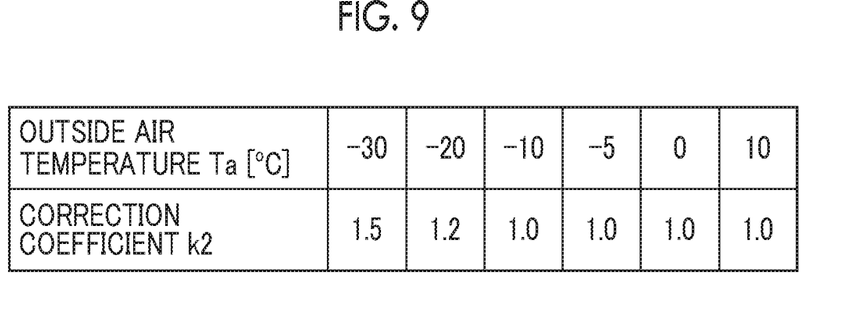
FIG. 9 is a conceptual diagram (FIG. 3) for describing an example of yet another map used for calculating the raising amount of the SOC control center.

FIGS. 7 to 9 are conceptual diagrams describing an example of a map used for calculating the raising amount ΔS of the SOC control center. With reference to FIGS. 7 to 9, in the map, the correspondence relationship between an insufficient time to perform the engine torque suppression control and the base raising amount $\Delta S_{base}$ is determined based on an experiment or a simulation in advance. The longer the insufficient time to perform the engine torque suppression control, the larger the base raising amount $\Delta S_{base}$ is set.

The correction coefficient k1 is a parameter based on the "GPF blockage level" indicating the degree of blockage of the filter 80. The GPF blockage level is divided into 6 stages in this example. The state where the filter 80 is not blocked at all corresponds to level 0, and the state where the filter 80 is completely blocked corresponds to level 5. The correction coefficient k1 is set to be larger as the blocking of the filter 80 due to PM progresses (the blockage level increases).

The correction coefficient k2 is a parameter for reflecting the influence of the outside air temperature Ta (preferably the average value of the past several times) on the raising amount ΔS of the SOC control center. The lower the outside air temperature Ta, the larger the correction coefficient k2 is set.

Referring back to FIG. 6, in S305, ECU 100 limits the raising amount ΔS of the SOC control center calculated in S304 to a predetermined upper limit amount UL (for example, an amount corresponding to SOC 15%) or less. That is, the ECU 100 uses the value calculated in S304 as it is when the raising amount ΔS of the SOC control center is equal to or less than the upper limit amount UL, but ΔS=UL when the raising amount ΔS of the SOC control center exceeds the upper limit amount UL.

The larger the raising amount ΔS of the SOC control center is, the smaller output from the motor generator 22 is smaller to minimize the discharge of the battery 60. As a result, when the raising amount ΔS of the SOC control center is excessively large, the fuel efficiency of the vehicle 1 in this trip may deteriorate. Therefore, a limit is imposed by the upper limit amount UL such that the raising amount ΔS of the SOC control center does not become excessively large. After performing the processing of S305, the process proceeds to S400.

Referring again to FIG. 4, in S400, ECU 100 starts raising the SOC control center. Since this control has been described in detail with reference to FIG. 3, the description thereof will not be repeated here.

In S500, the ECU 100 determines whether or not a condition for ending raising the SOC control center is satisfied. Specifically, the ECU 100 can determine that the condition for ending the SOC raising control is satisfied when a specified time (for example, 10 to 15 minutes) has elapsed since the start of raising the SOC control center, or when the vehicle 1 continues to travel even after passing the initially set destination. Since the prediction in the processing using the navigation system 91 described in S201 to S209 is not always correct, the success or failure of the above-mentioned ending condition is determined in case of an unexpected occurrence.

ECU 100 returns the process to S400 until the condition for ending raising of the SOC control center is satisfied (NO in S500), and continues raising of the SOC control center. When the condition for ending is satisfied (YES in S500), ECU 100 ends raising of the SOC control center and returns the SOC control center to the normal value (for example, SOC=56%) (S500).

As described above, in the embodiment, the SOC control center of the battery 60 is raised before the system stop (parking) of the vehicle 1. As a result, when the system of the vehicle 1 is started next time, a larger amount of stored electric power can be secured in the battery 60, and thus the period of time in which the engine torque suppression control can be performed becomes longer. In the embodiment, it is possible to achieve both suppression of PM emission and suppression of decrease in drivability.

In the embodiment, it has been described that the SOC control center is raised as an example of the control for raising the SOC control range of the battery 60, but the upper limit value and the lower limit value (particularly the lower limit value) of the SOC control range to be used may be raised.

The embodiments disclosed herein are to be considered to be illustrative and not restrictive in every respect. The scope of the disclosure is defined not by the detailed description of embodiments but by the claims, and is intended to cover all equivalents and all modifications within the scope of the claims.

What is claimed is:

1. A hybrid vehicle comprising:
an engine;
a filter configured to collect particulate matter in exhaust gas of the engine;
a power storage device;
an electric driving device configured to output torque using electric power stored in the power storage device and charge the power storage device; and
a control device configured to control a state of charge (SOC) of the power storage device to be within an SOC control range and perform a suppression control, wherein:
the suppression control is a control that suppresses output of the engine during a predetermined period of time after starting a vehicle system, and causes the electric driving device to output torque supplementing the suppressed output of the engine; and
the control device is configured to, raise the SOC control range by controlling the electric driving device before stopping the vehicle system when a deposition amount of the particulate matter on the filter exceeds a specified amount as compared to when the deposition amount is lower than the specified amount, and perform the suppression control at a next start after stopping the vehicle system.

2. The hybrid vehicle according to claim 1, wherein the control device is configured to raise the SOC control range when the deposition amount exceeds the specified amount and there is a history of canceling the suppression control due to a decrease in SOC of the power storage device during the predetermined period of time.

3. The hybrid vehicle according to claim 2, wherein the control device is configured to increase a raising amount of the SOC control range as an insufficient time to perform the suppression control by canceling the suppression control becomes larger for the predetermined period of time, when there is the history.

4. The hybrid vehicle according to claim 1, wherein the control device increases a raising amount of the SOC control range as the deposition amount increases.

5. The hybrid vehicle according to claim 1, wherein the control device is configured to raise the SOC control range when the deposition amount exceeds the specified amount and an outside air temperature is lower than a specified temperature.

6. The hybrid vehicle according to claim 5, wherein the control device is configured to increase the raising amount of the SOC control range as the outside air temperature decreases.

7. The hybrid vehicle according to claim 1, wherein the control device is configured to limit a raising amount of the SOC control range to be smaller than an upper limit amount.

8. The hybrid vehicle according to claim 1, wherein the control device is configured to raise the SOC control range when a destination of the hybrid vehicle is a location where cold-start of the engine is expected at the next start of the vehicle system.

9. The hybrid vehicle according to claim 1, wherein the control device is configured to raise the SOC control range when an estimated arrival time at a destination of the hybrid vehicle is a time when cold-start of the engine is expected at the next start of the vehicle system.

10. The hybrid vehicle according to claim 1, wherein the control device is configured to start raising the SOC control range when a scheduled traveling distance of the hybrid vehicle from a current position to a destination is shorter than a predetermined distance.

11. The hybrid vehicle according to claim 1, wherein the control device is configured to start raising the SOC control range when a scheduled traveling time of the hybrid vehicle from a current position to a destination is less than a predetermined time.

12. The hybrid vehicle according to claim 1,
wherein the electric driving device includes
a first rotating electric machine configured to charge the power storage device, and
a second rotating electric machine configured to output torque using electric power stored in the power storage device; and
the control device is configured to raise the SOC control range by controlling at least one of the first and second rotating electric machine.

13. A method of controlling a hybrid vehicle including an engine, a filter configured to collect particulate matter in exhaust gas of the engine, a power storage device, and an electric driving device configured to output torque using electric power stored in the power storage device and charge the power storage device, the method comprising:
raising an SOC control range of the power storage device by controlling the electric driving device before stopping the vehicle system when a deposition amount of the particulate matter on the filter exceeds a specified amount as compared to when the deposition amount is lower than the specified amount; and
performing a suppression control at a next start after stopping the vehicle system, wherein the suppression control is a control that suppresses output of the engine during a predetermined period of time after starting the vehicle system, and causes the electric driving device to output torque supplementing the suppressed output of the engine.

* * * * *